Aug. 8, 1972    F. GEBHARDT ETAL    3,682,751
APPARATUS FOR GLUING TOGETHER TWO WORK PIECES
Filed Sept. 16, 1968    4 Sheets-Sheet 3

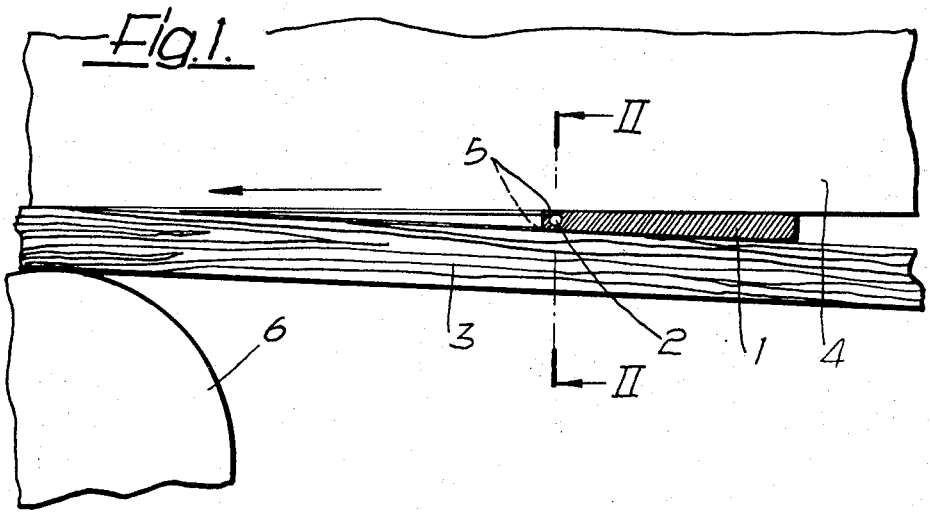
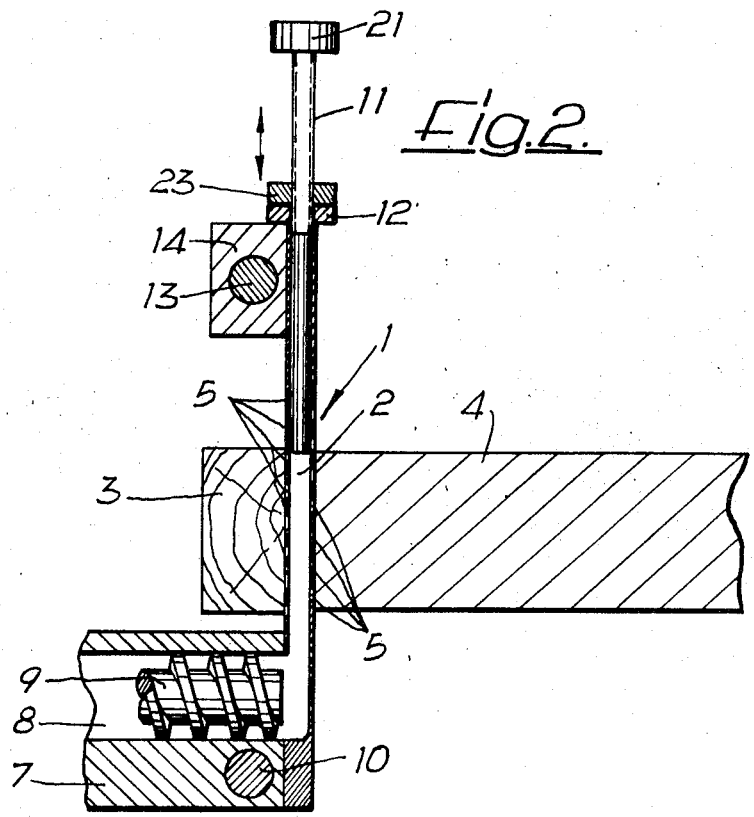

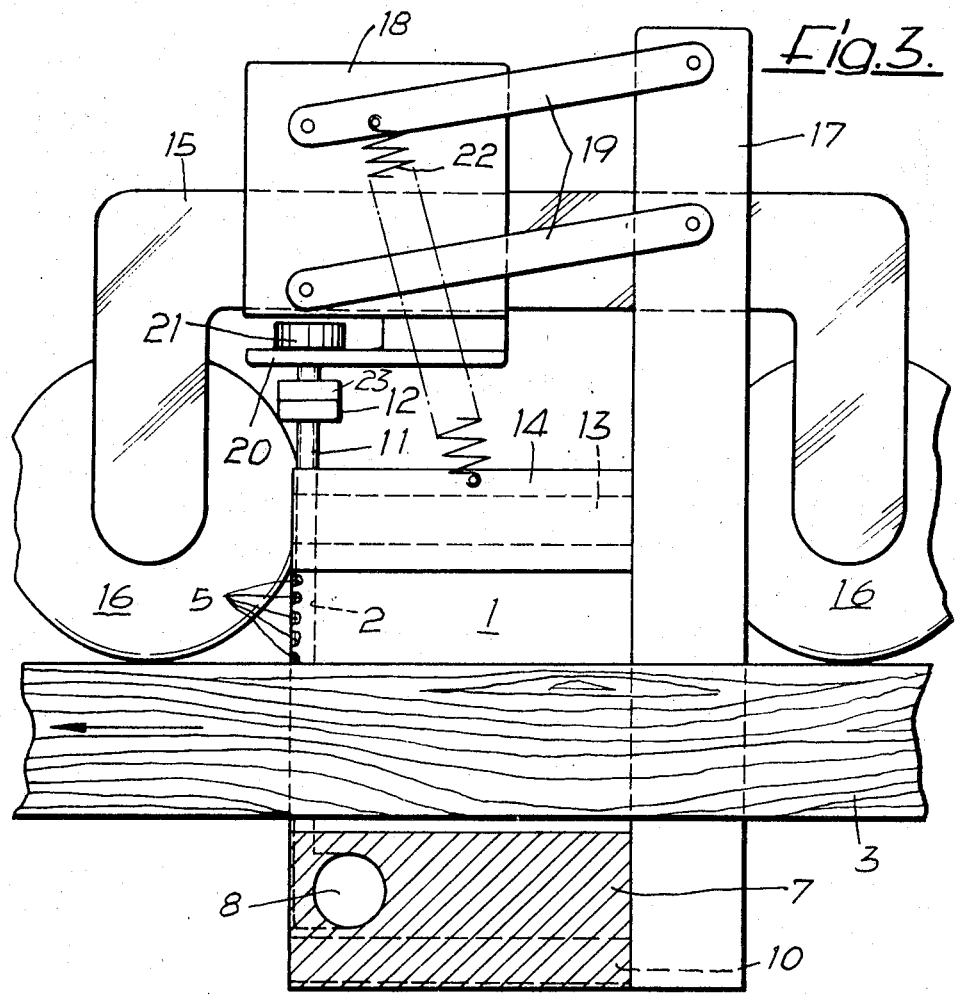
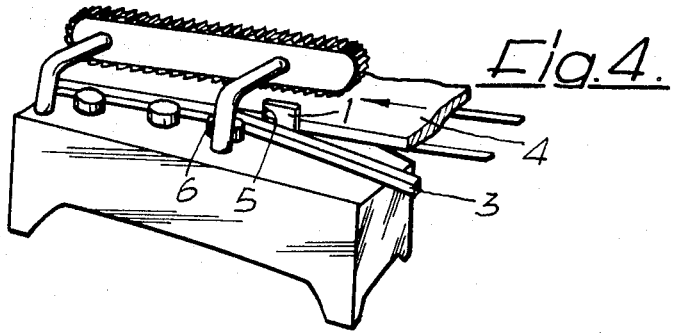

Inventors

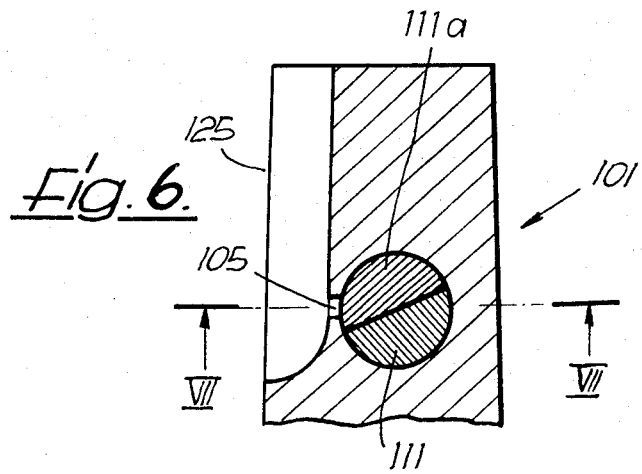
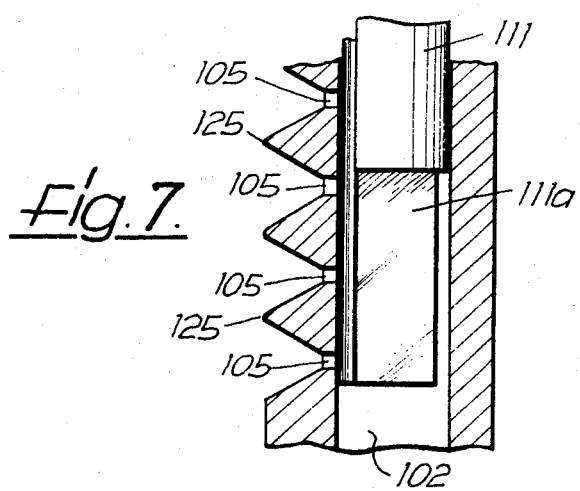
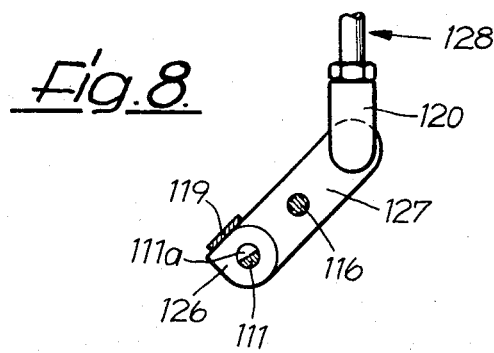

3,682,751
APPARATUS FOR GLUING TOGETHER TWO
WORK PIECES
Fritz Gebhardt, Nurtingen-Oberensingen, Otto Kaltenmark, Metzingen, Kurt Reich, Nurtingen, and Siegfried Keusch, Plochingen, Germany, assignors to Karl M. Reich Maschinenfabrik, Nurtingen, Germany
Filed Sept. 16, 1968, Ser. No. 762,177
Claims priority, application Germany, Sept. 19, 1967, P 16 53 702.3; Aug. 21, 1968, P 17 28 078.3
Int. Cl. B32b 31/08, 31/20
U.S. Cl. 156—546
16 Claims

ABSTRACT OF THE DISCLOSURE

An apparatus for gluing a flexible first work piece, preferably of wood or synthetic material, to a second work piece with at least one pressure roll for pressing together the two work pieces, which comprises a glue feeding means forming at least one conveyor device and a nozzle body adapted to enter the intermediate space between surfaces of the two work pieces, the surfaces pointing to each other, for applying glue material. A channel for feeding the glue material disposed adjacent the forward end face of the nozzle body pointing to the space to be glued. One end of the channel is connected with the glue feeding means. The nozzle body has at least one nozzle opening terminating in the channel for application of the glue material to the surface of at least one of the work pieces.

---

The present invention relates to an apparatus for gluing together a flexible first work piece, preferably of wood or synthetic material, to a second work piece with at least one pressure roll for pressing together the two work pieces, with a glue feeding device formed by means of a conveyor device and/or of a storage container and with a nozzle body, which enters into the space or chamber between the surfaces of both work pieces, which surfaces point towards each other for applying of a glue material.

An apparatus of the above-described type is known in which an injection-molding-like nozzle body having an adjustable mouth for applying of a glue material is used. In another known apparatus of the above-stated type, a wedge-shaped, heated glue material vessel with a glue dispensing roll enters between the two surfaces of the two work pieces, which surfaces point towards each other, for applying the glue material. The glue application can take place in this apparatus only at one of the surfaces, particularly the one on which the glue applying roll rolls off. In another known glue application device, a second glue applying roller is provided, which makes possible the glue application on both surfaces pointing towards each other. An apparatus is also known in which, in addition to a heated glue vessel, also an inner heating is provided for the glue application roll. It should prevent, that the glue material, in particular a melt gluing device, setting immediately upon cooling, is cooled off, which melt gluing device moves as a thin film on the roll periphery continuously in the air, so that particularly strong preheating of the the glue material in the heated glue vessel can be eliminated.

All above-stated known devices have as a common feature, that the angle between the first flexible work piece and the second work piece at the place of the glue application is so extensive, due to the space requirement by the apparatus for the glue application, that with increasing stiffness of the first work piece, a relatively great distance between the place of the glue application and of, for instance, a first pressure roll is provided, so that, for instance, by using of hot glue, in spite of the known measures for preventing of a fast cooling of the glue material, the advance speed of the work pieces must still be very high to an undesirable extent, in order, even in case of glue application on both surfaces, a safe gluing of the two work pieces is brought about. Also, in connection with cold glues, which are highly solvent-containing, the great distance between the place of the glue application and of the pressure roll is of a disadvantage, since the solvent can, in the meantime, evaporate and thereby the glue material composition is changed. Thus, the great angle leads in the known devices to the point, that flexible first work pieces, for instance, glue applicators, above a certain strength cannot be glued due to the reduced flexibility. Strong woods cannot be first bent in the required manner, then fed and finally glued on without, in the still permissible space between the glue application and the pressure roll without use of vapor or steam by means of glue machines with one of the known devices used with a great angle. If too strong glue applications are, nevertheless, dry bent, fiber breaks occur in the material and the end of the glue applicator lifts off the second work piece due to its bending elasticity.

It is one object of the present invention to provide an apparatus for gluing together of two work pieces by providing a flexible first work piece and a second work piece, which apparatus requires with the lowest possible spacing between the place of the glue application and the pressure roll only a low angle between the two work pieces, so that also slightly bendable or flexible first work pieces can be glued on.

It is another object of the present invention to provide an apparatus for gluing together of two work pieces, wherein a channel for feeding of the glue material is provided adjacent the forward end face pointing to the gluing place, which channel extends parallel to the forward end face of the nozzle body, one end of the channel being connected with the glue material feed and wherein in the nozzle body, at least one nozzle opening is provided terminating into the channel for applying the glue material to the surface of at least one work piece. By this arrangement, it is brought about, that the glue material feed can be arranged outside of the spacing between the two work pieces or at such distance behind the nozzle body such, that the size of the angle is determined solely by the nozzle body, which can be designed very flat by the arrangement of the present invention and thus causes in a short open stretch between the place of the glue application and the pressure roll a very small angle. Thus, also less flexible first work pieces can be glued on. The advance speed of the joint work pieces can be about half the size in a glue applying machine with the apparatus of the present invention as in a glue applying machine with glue application rolls. It is possible, without difficulty, to provide the nozzle openings in the nozzle body in such manner that the desired one-sided or double-sided or other glue application can take place.

A particular advantage resides in the fact that the apparatus in accordance with the present invention can be set to different gluing widths, if in both described advantageous embodiments it is provided, that the end of the feeding channel remote from the glue material feed is open and that in that end a control pin enters sealingly, which control pin is axially adjustable for setting of a predetermined gluing width. The setting can take place automatically by a sensing device.

In case vapor bubbles should be formed in the heated glue material, which cause an expansion of the glue material and thereby an undesirable run-out thereof from the nozzle opening during the working pauses, a closing possibility of the nozzle opening during the gluing process or between two successive gluing processes is desirable.

Suitably, this can be done such, that the nozzle opening can be closed or can be opened without changing thereby the set gluing width.

In the second embodiment of the apparatus designed in accordance with the present invention, the control pin is therefore one part of a round rod fitting into the cylindrical channel and a closing rod extending at least over the entire width of the nozzle opening is provided as a complementary part, which jointly with the control pin forms a rotary slide valve. By axial displacement of the control pin in the channel, the gluing width can be adjusted independently from the rotary position of the rotary slide. The closing rod extending over the entire width of the nozzle opening complements the control pin to a round rod fitting into the cylindrical channel, so that upon rotation of the closing rod for opening or closing of the nozzle opening, the control pin is forcibly joined for rotation, yet remains unchanged in its axial setting. The nozzle opening can be thus closed or opened at any time without variation of the glue width. For this corresponding angular position of the rotary slide valve to the nozzle opening, only a small rotary angle determined upon the width of the nozzle opening is required. Since the control pin and the closing rod complement each other within the range of the channel disposed outside the glue zone and pointing away from the glue material feed to a round rod completely filling the cylindrical channel, no glue material can enter in the indicated range and no glue material can form there remainders. Forcibly, thus, also no glue material can emerge through the open end of the channel. Suitably, the control pin and the closing rod are formed as semiround rods.

The rotary disc valve is in the second embodiment adjustable or settable in its rotary position by means of a preferably pneumatically operable slide piston drive engaging the closing rod. For the axial setting of the control pin serves an adjustment spindle to be set manually. It is also possible to provide, however, a sensing device, which sets automatically the gluing width by at least one roller sensing the width of the work piece.

As conveying means, a conveyor screw is provided in the first embodiment, in spite of the fact that in the second embodiment, a preferably pneumatically operable cylinder piston unit is preferred.

Instead of an electro motor and a drive for driving of a conveyor screw, merely pressurized air is required for operation of the pneumatic conveying device, which pressurized air is available practically in all work shops. A pneumatic conveying device can, furthermore, not be damaged or destroyed, if the glue material to be fed is at the start of the gluing process still cold and not yet sufficiently thin liquid.

Since during the pause between two gluing processes a return stroke of a feeding piston of the pneumatic conveying device takes place, not only glue material is sucked from the storage container into the cylinder, but also the glue disposed in the channel and the nozzle opening is somewhat withdrawn and freed from pressure.

The pneumatic conveying device supports, thus, in the second embodiment the rotary slide valve in its task to prevent an emerging of the glue material from the nozzle opening during the working pauses.

With these and other objects in view which will become apparent in the following detailed description, the present invention which is given by example only, will be clearly understood in connection with the accompanying drawings, in which:

FIG. 1 is a cross-section of the nozzle body and showing the channel in the first embodiment of the present invention;

FIG. 2 is a section along the lines II—II of FIG. 1;

FIG. 3 is an end view of the first embodiment of the present invention;

FIG. 4 is a perspective view of the gluing machine incorporating the apparatus of the present invention;

FIG. 6 is a fragmentary section, shown at an enlarged scale, along the lines VI—VI of FIG. 5 through the nozzle body of the second embodiment of the present invention;

FIG. 7 is a fragmentary section along the lines VII—VII of FIG. 6; and

FIG. 8 is a fragmentary section along the lines VIII—VIII of FIG. 5.

Figure 5:
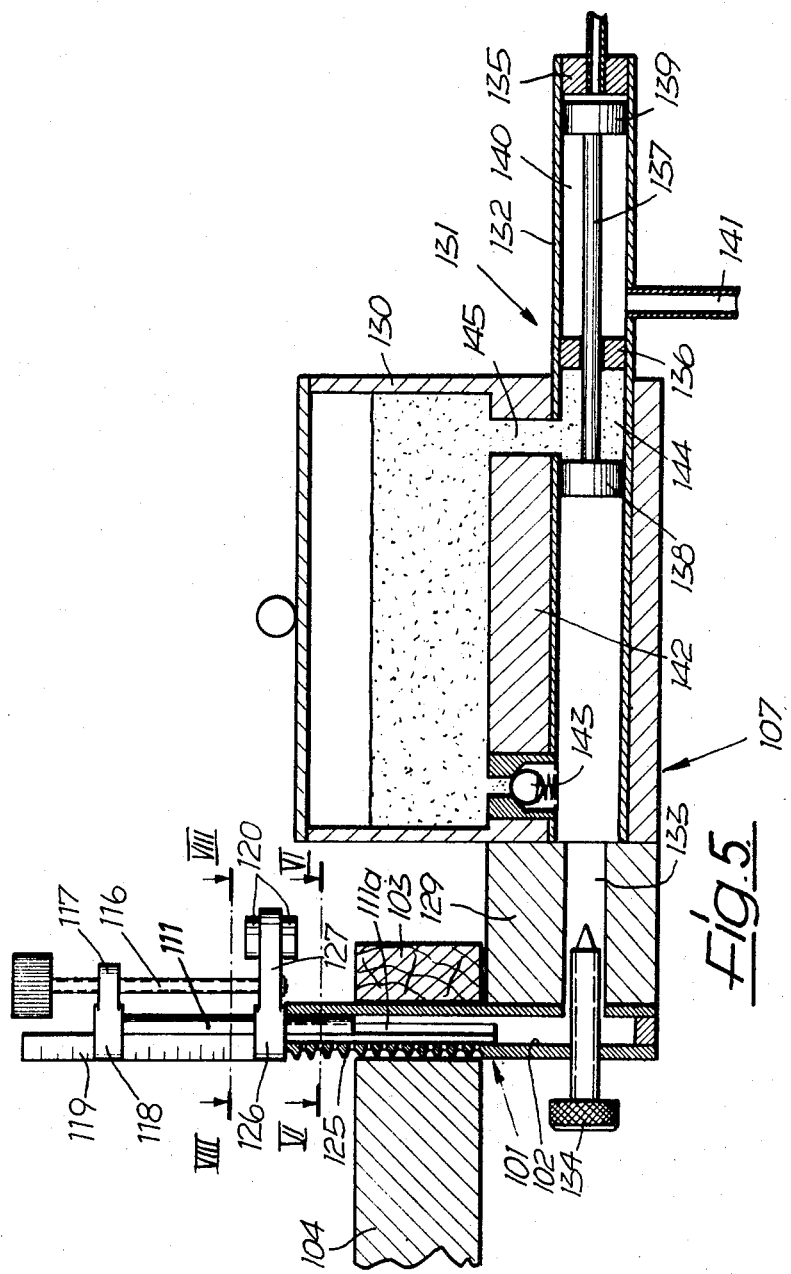
FIG. 5 is a vertical section of the second embodiment of the apparatus designed in accordance with the present invention.

Referring now to the drawings, and in particular to FIGS. 1–4, in which the first embodiment of the present invention is disclosed, the apparatus comprises a nozzle body 1 which has a channel 2 for feeding the glue material, which channel 2 extends parallel to the forward end face of the nozzle body 1 pointing towards the gluing space or location. The nozzle body 1 grips wedge-like into the intermediate space between a flexible first work piece 3 and a second work piece 4. By means of nozzle openings 5 terminating into the channel 2 of the nozzle body 1, glue is applied to the two surfaces of the work pieces pointing towards each other. At the place, at which the intermediate space between the faces to be glued together closes, looking in the advancing direction, a pressure roller 6 engages the flexible first work piece 3 and presses the same towards the second work piece 4. It is expedient to provide additional pressure rollers in the advancing direction after the roller 6.

The channel 2 of the nozzle body is equipped with two rows of nozzle openings 5 disposed in two rows set off relative to each other. The nozzle openings of the one row terminate thereby at the surface of the flexible first work piece 3 and the nozzle openings 5 of the other row terminate at the surface of the second work piece 4.

One end of the channel 2 of the nozzle body 1 is connected with a glue material feed 7 disposed outside of the intermediate space between the faces to be glued together. The glue material feed 7 has a feeding channel 8, in which a conveyor screw 9 feeds the glue material from a storage container (not shown) into the channel 2.

A heating member 10 for heating the glue material feed is likewise provided.

The end of the channel 2 remote from the glue material feed 7 is open, whereby a control pin 11 enters sealingly in this end. Since the two rows of nozzle openings 5 in the channel 2 on the side of the work piece 3 remote from the glue material feed 7 extend over the range of the width of the work pieces in the direction towards the open end of the channel 2, by axial displacement of the control pin 11 in the channel 2 a selective number of nozzle openings 5 terminating in the channel 2 are locked and thereby a predetermined glue width can be set. For the setting of the gluing width serves a setting nut 12, for which the control pin 11 carries a thread and which setting nut at the point of reaching the desired gluing width abuts on a screw block 14 of the nozzle body 1 equipped with a heating member 13. By the setting nut 12 a minimum gluing width can be set which cannot fall below a minimum set width.

For the automatic setting of the gluing width serves a sensing device, which displaces in case of a different width of one of the work pieces 3, 4 the control pin 11 correspondingly axially in the channel 2. The sensing device has two running sensing rollers 16 connected by a bow 15 on the side of one of the two work pieces 3 and 4, preferably of the first work piece 3 pointing towards the control pin 11.

In order to avoid tipping of the bow 15 if only one of the sensing rollers 16 engages the workpiece, a carrier 17 rigidly connected with the nozzle body 1 and a parallelogram mechanism 19 pivotally connected with a part 18 of the bow 15 are provided as a parallel guide. The connection between the part 18 of the bow 15 and the control pin 11 is produced by means of a slotted strip, into which enters a head 21 of the control pin 11, so that the latter, as to its axial position in the channel 2, follows without play the movement of the sensing device, if the latter is brought into engagement on the end face of the work piece by means of a helical pull spring 22.

In case of equally thick work pieces, the sensing device can be eliminated. In this case, namely, it will suffice to adjust the gluing width by setting of the control pin 11 manually. In order to prevent that the control pin 11 displaces itself, the setting nut 12 can be rigidly connected with the screw block 14 and a counter nut 23 can be provided or an inner thread for the control pin 11 can be provided at the open end of the channel 2, whereby then the nut 12 can serve as a counter nut.

For the starting and stopping of the drive for the conveyor screw 9, at least one limit switch sensing one of the work pieces, preferably the first work piece 3, can be provided, which brings about that glue material is fed into the channel 2 only, as long as the limit switch is operated by the first work piece 3.

FIG. 4 shows a glue applying machine which is equipped with the apparatus of the present invention. The advance of the joined work pieces takes place thereby by means of an endless band engaging the surface of the second work piece 4.

In the second embodiment, a vertically disposed nozzle body 101 has a channel 102 for feeding the glue material, which extends parallel to the forward end face of the nozzle body 101 which end face is pointing towards the place to be glued. The nozzle body 101 grips wedge-like into the intermediate space between a flexible first work piece 103 and a second work piece 104. By nozzle openings terminating in the channel 102 of the nozzle body 101 and provided in a row on the side of the nozzle body 101 pointing towards the second work piece 104, glue material is applied on the surface of the second work piece 104 pointing towards the nozzle body 101. Between the nozzle openings 105 wedge-formed ribs 125, formed by workings, extending in the nozzle body 101 in advancing direction of both work pieces, the projecting edges of the ribs 125 engaging the surface of the second work piece 104 and the ribs 125 distribute line-like, during the advance of the two work pieces, the glue material emerging from each nozzle opening 105.

The end of the channel 102 pointing away from the glue material feed 107 of the apparatus is open, whereby a rotary slide valve formed of a control pin 111 and a closing rod 111a enters sealingly into this open end of the channel 102. Since the rows of the nozzle openings 105 in the channel 102 on the side of the work pieces 103 and 104 pointing away from the glue feed 107 extend over the range of the shown width of the work pieces in the direction towards the open end of the channel 102, by axial displacement of the control pin 111 in the channel 102 a selective number of nozzle openings 105 terminating in the channel 102 can be locked and thereby a predetermined glue width can be set. For the setting of the glue width serves a vertically disposed setting spindle 116, which enters in a lateral short arm 117 of a connecting part 118 secured to the upper end of the control pin 111 with a plane upper side and the lower end thereof is rotatably mounted in a lateral arm 127, which is formed with a disc 126 connected with the upper end of the closing rod 111a. At the disc 126 is secured a vertically arranged ruler 119, the zero mark of which is flush with the plane upper side of the closing part 118, if the gluing width is set at zero with the control pin 111.

The total weight of the rotary disc valve 111, 111a and of the parts connected therewith and its friction in the channel 102 suffices, in order to prevent a pressing out of the rotary slide valve 111, 111a from the channel 102 by the gluing material fed under pressure.

The control pin 111 as well as the closing rod 111a is formed as a semiround rod and both complement each other to a full round rod. It is, thus, possible to force by rotation of the closing rod 111a extending along all nozzle openings 105 forcibly to join for rotation of the control pin 111 which penetrates by a fitting semi-circular recess in the disc 126 into the open end of the channel 102. The free end of the arm 217 on the disc 126 is pivotally connected with a fork pivot 120 of the piston rod of a pneumatically operable slide piston drive 128. By this arrangement, the rotary position of the rotary slide valve 111, 111a can be pneumatically set.

The glue material feed 107 has a throttle part 129, a glue material container 130 and a pneumatically operating cylinder-piston-unit 131. In the throttle part 129 is disposed a throttle bar 133 connecting the channel 102 with one end face of the cylinder 132 of the cylinder-piston-unit 131, into which throttle bore 133 an axially adjustable throttle slide 134 enters from the side of the second work piece 104 through the nozzle body 101.

The end of the cylinder 132 remote from the throttle part 129 is equipped wtih a closing part 135 suitable for the connection of an air pressure conduit (not shown). Within the cylinder 132 is provided a separating wall 136 having a bore and dividing the cylinder space into two parts, which bore receives a piston rod 137. The end of the piston rod 137 pointing towards the throttle part 129 carries a feeder piston 138, while the end pointing to the closing part 135 carries a working piston 139 subjected on both sides to pressurized air. In the intermediate chamber 140 formed by the separating wall 136 and the closing part 135 terminates a connecting branch 141 adjacent to the separating wall 136, to which connecting branch 141 a second pressurized air conduit (not shown) is secured.

Above the cylinder-piston-unit 131 and adjacent to the nozzle body 101 is at a sufficiently large distance from the nozzle body 101 the glue material container 130. The bottom 142 of the latter is equipped with a passage connecting the inner space of the container 130 with the cylinder 132, which passage is disposed in the neighborhood of the throttle 129 and in which a return valve 143 is arranged open during the return stroke of the feeding piston 138. The length of the piston rod 137 is measured such that in case the working piston 139 engages the closing part 135, a minimum intermediate space 144 is formed between the piston rod 138 and the separating wall 136, which intermediate chamber 144 is in continuous communication with the inside of the glue material container 130 by means of the second passage 145 in the cylinder 132 and the bottom 142. By the variable feeding and return strokes of the feeding piston 138, the intermediate chamber 144 is alternately enlarged and reduced, respectively, whereby glue material is sucked from the container 130 into the chamber 144 and is pressed out from the latter, respectively, so that a forced revolution of the glue material in the container 130 results.

In order to engage the ribs 125 on the surface of the second work piece 104 pointing to the ribs 125, the entire apparatus is pressed by a spring force towards the second work piece 104. In this case, suitably flexible pressurized air conduits are used to the cylinder 132 and to the slide piston drive 128.

The feed of pressurized air for the selective subjecting to air pressure the two end sides of the working piston 139 for a feeding and a return stroke, respectively, is controllable by two limit switches (not shown) operable by at least one work piece successively, the first operated limit switch releases and locks, respectively, successively at the start and at the end of the gluing process the pressurized air feed for a feeding stroke and the second operated limit switch reducing thereafter successively releases and locks, respectively, the pressurized air feed for a return stroke. Suitably, also a control device is provided coupled with the limit switches, which control device controls the pressurized air feed to the slide piston drive 128 such, that the closing rod 111a opens the nozzle openings 105 at the start of the gluing process and closes the same at the end thereof.

We claim:

1. An apparatus for gluing a flexible first work piece, preferably of wood or synthetic material to a second work piece with at least one pressure roll for pressing together said two work pieces, comprising a glue feeding means forming at least one conveyor device, a nozzle body entering the intermediate space between opposite surfaces of said two work pieces, said surfaces pointing to each other, for applying glue material, said nozzle body being of wedge shape, forming a front end face of smaller height and a rear end face of greater height, and a channel for feeding said glue material disposed adjacent the forward end face of said nozzle body pointing to the space to be glued, one end of said channel being connected with said glue feeding means, and said nozzle body having at least one nozzle opening terminating in said channel for application of said glue material to the surface of at least one of said work pieces.

2. The apparatus, as set forth in claim 1, which includes at least one row of said nozzle openings extending parallel to the forward end face of said nozzle body.

3. The apparatus, as set forth in claim 1, wherein the end of said channel remote from said glue feeding means being open, a control pin sealingly entering said end of said channel, and said control pin being axially settable for setting a predetermined gluing width.

4. The apparatus, as set forth in claim 3, wherein said control pin is formed as a part of a rod of a round cross-section fitting in said cylindrical channel, and a closing rod extending over the entire width of said nozzle opening as a part of a cross-section complementary to the cross-section of said control pin, and said closing rod forming jointly with said control pin a rotary slide valve.

5. An apparatus for gluing a flexible first work piece, preferably of wood or synthetic material to a second work piece with at least one pressure roll for pressing together said two work pieces, comprising a glue feeding means forming at least one conveyor device, a nozzle body entering the intermediate space between opposite surfaces of said two work pieces, said surfaces pointing to each other, for applying glue material, said nozzle body being of wedge shape, forming a front end face of smaller height and a rear end face of greater height, and a channel for feeding said glue material disposed adjacent the forward end face of said nozzle body pointing to the space to be glued, one end of said channel being connected with said glue feeding means, and said nozzle body having at least least one nozzle opening terminating in said channel for application of said glue material to the surface of at least one of said work pieces, the end of said channel remote from said glue feeding means being open, a control pin sealingly entering said end of said channel, and said control pin being axially settable for setting a predetermined gluing width, said control pin is formed as a part of a rod of a round cross-section fitting into said cylindrical channel, and a closing rod extending over the entire width of said nozzle opening as a part of a cross-section complementary to the cross-section of said control pin, said closing rod forming jointly with said control pin a rotary slide valve, and said control pin and said closing rod each of half-circular cross-section.

6. The apparatus, as set forth in claim 5, which includes a pneumatically operable piston drive including a piston rod for setting said rotary slide valve in its rotary position.

7. The apparatus, as set forth in claim 6, which includes an arm secured to said closing rod, and said arm is pivotally connected at its free end with said piston rod of said piston drive.

8. The apparatus, as set forth in claim 7, which includes a disk having a bore, said arm is secured to said disk, the latter receiving said rotary slide valve in said bore and is connected for joint rotation with said axially immovable closing rod.

9. The apparatus, as set forth in claim 8, which includes a ruler extending in longitudinal direction of said control pin and secured to said disk, a closing arm with a lateral arm secured to the end of said control pin remote from said glue feeding means, and a setting spindle for said control pin enters said last mentioned arm and is rotatably mounted in said previously mentioned arm on said disk.

10. The apparatus, as set forth in claim 5, which includes a cylinder operatively connected with said channel, a separating wall sealingly disposed in said cylinder, a feeding piston reciprocating in said cylinder on one side of said separating wall, and a working piston operated on both of its faces by pressurized air and reciprocating in said cylinder, a piston rod projecting through said separating wall and carrying said feeding piston and said working piston, said feeding piston disposed closer to said nozzle body jointly with said separating wall defining a first variable chamber, a storage container continuously communicating with said first variable chamber, said separating wall jointly with said working piston defining a second variable chamber, a pressurized air feeding means continuously communicating with said second variable chamber, communication means between one of the faces of said feeding piston remote from said first variable chamber and said storage container, and a return valve controlling said communication means.

11. The apparatus, as set forth in claim 1, wherein said glue feeding means comprises a pneumatically operated cylinder-piston-unit.

12. The apparatus as set forth in claim 1, wherein said at least one nozzle opening is provided only on one side of said nozzle body pointing towards said surface of said work pieces.

13. An apparatus for gluing a flexible first work piece, preferably of wood or synthetic material to a second work piece with at least one pressure roll for pressing together said two work pieces, comprising a glue feeding means forming at least one conveyor device, a nozzle body entering the intermediate space between opposite surfaces of said two work pieces, said surfaces pointing to each other, for applying glue material, said nozzle body being of wedge shape, forming a front end face of smaller height and a rear end face of greater height, and a channel for feeding said glue material disposed adjacent the forward end face of said nozzle body pointing to the space to be glued.

one end of said channel being connected with said glue feeding means, said nozzle body having at least one nozzle opening terminating in said channel for application of said glue material to the surface of at least one of said work pieces, at least two of said rows of nozzle openings, said nozzle body has two faces disposed opposite corresponding faces of said work pieces, and at least one of said rows each is disposed on said faces of said nozzle body pointing toward said corresponding faces of said work pieces.

14. The apparatus, as set forth in claim 13, wherein said rows of nozzle openings on said corresponding faces of said work pieces are disposed parallel and shifted relative to each other in longitudinal direction of said rows, so that said nozzle openings of one of said rows are disposed opposite the spaces between said nozzle openings of the other of said rows.

15. An apparatus for gluing a flexible first work piece, preferably of wood or synthetic material to a second work piece with at least one pressure roll for pressing together said two work pieces, comprising a glue feeding means forming at least one conveyor device, a nozzle body entering the intermediate space between opposite surfaces of said two work pieces, said surfaces pointing to each other, for applying glue material, said nozzle body being of wedge shape, forming a front end face of smaller height and a rear end face of greater height, and a channel for feeding said glue material disposed adjacent the forward end face of said nozzle body pointing to the space to be glued, one end of said channel being connected with said glue feeding means, and said nozzle body having at least one nozzle opening terminating in said channel for application of said glue material to the surface of at least one of said work pieces, a plurality of said nozzle openings being disposed on the side of said nozzle body pointing towards said second work piece, and wedge shaped ribs being disposed between said nozzle openings and extending in advancing direction of said two work pieces.

16. An apparatus for gluing a flexible first work piece, preferably of wood or synthetic material to a second work piece with at least one pressure roll for pressing together said two work pieces, comprising a glue feeding means forming at least one conveyor device, a nozzle body entering the intermediate space between opposite surfaces of said two work pieces, said surfaces pointing to each other, for applying glue material, said nozzle body being of wedge shape, forming a front end face of smaller height and a rear end face of greater height, and a channel for feeding said glue material disposed adjacent the forward end face of said nozzle body pointing to the space to be glued, one end of said channel being connected with said glue feeding means, and said nozzle body having at least one nozzle opening terminating in said channel for application of said glue material to the surface of at least one of said work pieces, the end of said channel remote from said glue feeding means being open, a control pin sealingly entering said end of said channel, and said control pin being axially settable for setting a predetermined gluing width, means for axial setting of said control pin, and at least one roller sensing the width of one of said work pieces and controlling said axial setting means.

References Cited

UNITED STATES PATENTS

| | | | |
|---|---|---|---|
| 2,516,280 | 7/1950 | Welch | 156—546 X |
| 2,796,847 | 6/1957 | Guggenheim | 118—411 |
| 3,282,766 | 11/1966 | Wright | 156—544 X |
| 3,427,932 | 2/1969 | Wagner | 118—411 X |

BENJAMIN A. BORCHELT, Primary Examiner

J. M. HANLEY, Assistant Examiner

U.S. Cl. X.R.

156—544; 118—24